W. E. BROWN.
FRUIT HOLDER.
APPLICATION FILED OCT. 25, 1916.
1,241,338. Patented Sept. 25, 1917.
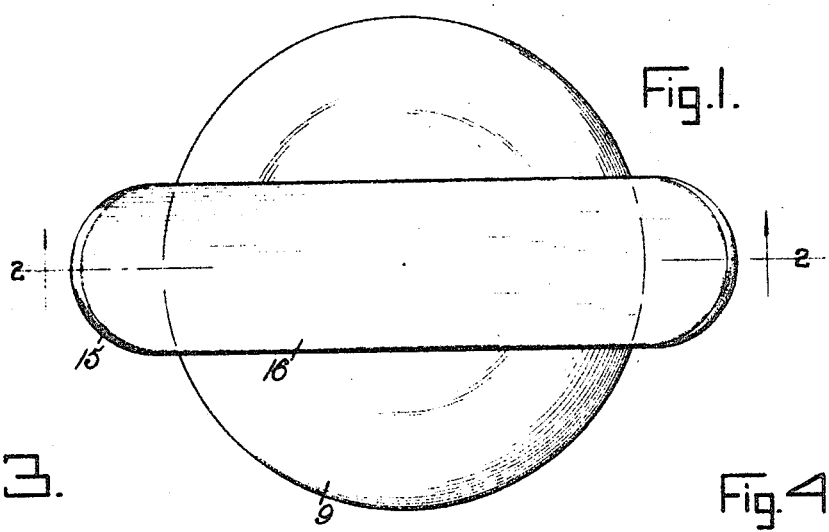
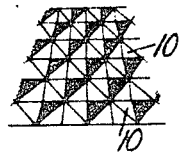
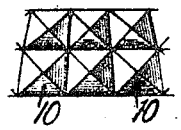
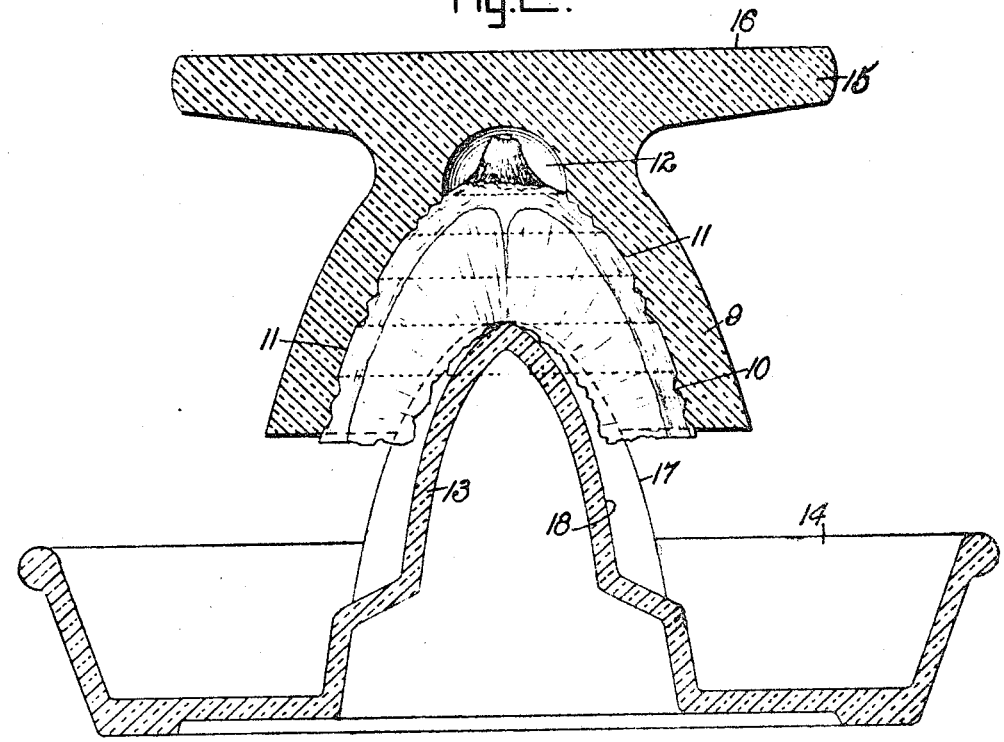
WITNESSES
INVENTOR
W. E. Brown
BY
ATTORNEYS

UNITED STATES PATENT OFFICE.

WILLIAM ESTEE BROWN, OF SACRAMENTO, CALIFORNIA.

FRUIT-HOLDER.

1,241,338.　　　　　　Specification of Letters Patent.　　Patented Sept. 25, 1917.

Application filed October 25, 1916. Serial No. 127,580.

*To all whom it may concern:*

Be it known that I, WILLIAM ESTEE BROWN, a citizen of the United States, and a resident of Sacramento, in the county of Sacramento and State of California, have invented a new and Improved Fruit-Holder, of which the following is a full, clear, and exact description.

Among the principal objects which the present invention has in view are: to hold fruit without soiling the hands of the operator while extracting juices therefrom; to avoid the extraction of oils and unpalatable parts of the skin of citrus fruit when extracting the juices from said fruit; to maintain the grip of the holder upon the fruit during the operation of extracting juices; and to simplify the construction of the holder.

Drawings.

Figure 1 is a top plan view of the holder constructed and arranged in accordance with the present invention;

Fig. 2 is a vertical section of the holder, the section being taken as on the line 2—2 in Fig. 1;

Figs. 3 and 4 are detail views showing modified forms of the construction of the inner surface of the holder.

Description.

As seen in the drawings, the holder is preferably constructed of glass as conducive of a perfect sanitation. It will be understood, however, that other materials, such as metal or wood, may be employed where desired.

The holder is provided with a bowl 9, the inner surface of which is shaped in correspondence with the fruit to be handled by the operator. The inner surface is preferably furnished with a series of burs 10. The burs 10, as shown best in Fig. 4, are pointed but are not of sufficient height, length, or sharpness to penetrate through the skin of the fruit being handled to the ridges 17 of the macerating column 13. The pressure exerted upon the holder causes the burs to grip the skin of the fruit being handled, thereby preventing movement thereof in the bowl 9 when the holder is rotated. The burs 10 are preferably arranged as shown best in Figs. 2 and 4 of the drawings, to form a series of double rows. Between the series of burs, smooth section zones 11 are formed into which the skin of the fruit sinks, said zones assisting in retaining the fruit in the bowl after being pressed therein.

The present invention is used in conjunction with squeezers of conventional shape and structure, and is particularly designed for handling citrus fruit. To accommodate the nib of the fruit, the holder has a recess 12 formed therein. The recess is offset from the inner surface of the bowl 9 and prevents the point of the macerating column 13 of the squeezer 14 from cutting into said nib and the fleshy part of the skin of the fruit existing there. Between the ridges 17 of the macerating column of the squeezer 14, are formed valleys 18 for the concentration and guidance of the juices when liberated from the fruit being treated.

The bowl 9 has a bar handle 15, the upper surface 16 whereof is preferably flat to sustain the pressure of the hand of the operator thereon.

When using a holder of the character shown and described, the fruit is placed in the bowl 9 and pressed upon the column 13. The pressure exerted thereon forces the burs 10 into the skin of the fruit, which thereafter prevents the fruit from turning in the bowl 9, or the bowl 9 from turning around upon the fruit. The pressure being continued forces intermediate portions of the skin into the zone sections 11, which thereafter prevents the fruit from falling out of the bowl 9.

It is evident that when fruit, such as lemons or oranges, are handled by means of the holder herein shown and described, the citrus oils or fruit acids are prevented from soiling or disfiguring the hands of the operator. Also it is evident that when manipulating the fruit by means of the holder, greater pressure may be applied thereon, and in consequence the juices may be more completely extracted therefrom.

*Claim.*

As an article of manufacture, a holder as characterized having an inverted globular bowl, the inner surface whereof is provided with retaining burs, said burs being arranged to form circular rings with interposed smooth sections for retaining the fruit within the grasp of said bowl; and a handle mounted on said bowl at the apex thereof.

WILLIAM ESTEE BROWN.